(12) United States Patent
Choi et al.

(10) Patent No.: US 12,526,470 B2
(45) Date of Patent: Jan. 13, 2026

(54) ELECTRONIC DEVICE AND CONTROL METHOD THEREOF

(71) Applicant: SAMSUNG ELECTRONICS CO., LTD., Suwon-si (KR)

(72) Inventors: Jinwuk Choi, Suwon-si (KR); Byounghyun Kim, Suwon-si (KR); Hyeseon Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 18/084,207

(22) Filed: Dec. 19, 2022

(65) Prior Publication Data

US 2023/0118698 A1 Apr. 20, 2023

Related U.S. Application Data

(63) Continuation of application No. PCT/KR2021/007684, filed on Jun. 18, 2021.

(30) Foreign Application Priority Data

Jun. 19, 2020 (KR) .................. 10-2020-0075055

(51) Int. Cl.
*H04N 21/431* (2011.01)
*H04N 21/442* (2011.01)
(Continued)

(52) U.S. Cl.
CPC ... *H04N 21/4312* (2013.01); *H04N 21/44222* (2013.01); *H04N 21/4532* (2013.01); *H04N 21/4668* (2013.01)

(58) Field of Classification Search
CPC ......... H04N 21/4312; H04N 21/44222; H04N 21/4532; H04N 21/4668; H04N 21/43615;
(Continued)

(56) References Cited

U.S. PATENT DOCUMENTS 8,352,643 B2 1/2013 Birnbaum et al.
8,522,279 B2 8/2013 Lee
(Continued)

FOREIGN PATENT DOCUMENTS

EP 3 190 796 A1 7/2017
EP 3 273 697 A1 1/2018
(Continued)

OTHER PUBLICATIONS

Extended European Search Report dated Aug. 2, 2023 in European Patent Application No. 21825314.4.
(Continued)

*Primary Examiner* — Nathan J Flynn
*Assistant Examiner* — Christine A Kurien
(74) *Attorney, Agent, or Firm* — STAAS & HALSEY LLP

(57) ABSTRACT

An electronic device comprising a display; a memory to store recommended content information and a processor which: controls a communication interface to communicate with an external device that receives content from a plurality of content providers and provides the content to the electronic device; when a user command to display a UI screen including information on the external device is input, obtains recommended content information related to the plurality of content providers connected to the external device on the basis of information stored in the memory; and controls the display to display a UI screen to which the external device and the obtained recommended content information are mapped, where the information stored in the memory is obtained on the basis of viewing history information corresponding to the external device.

19 Claims, 16 Drawing Sheets

(51) Int. Cl.
*H04N 21/45* (2011.01)
*H04N 21/466* (2011.01)

(58) Field of Classification Search
CPC ......... H04N 21/44008; H04N 21/4826; H04N 21/41407; G06Q 30/0201; G06Q 30/0255; G06Q 30/0282; G06Q 50/10
See application file for complete search history.

(56) References Cited

U.S. PATENT DOCUMENTS

| | | | |
|---|---|---|---|
| 9,819,997 B2* | 11/2017 | Seo | H04N 21/4826 |
| 10,101,874 B2 | 10/2018 | Kwon et al. | |
| 10,225,507 B2 | 3/2019 | Yoon et al. | |
| 10,306,318 B2 | 5/2019 | Lee et al. | |
| 10,965,972 B2 | 3/2021 | Choi et al. | |
| 11,032,601 B2 | 6/2021 | Kim et al. | |
| 11,146,859 B2 | 10/2021 | Choi et al. | |
| 11,175,789 B2 | 11/2021 | Park et al. | |
| 11,513,669 B2* | 11/2022 | Chhabra | G06F 3/04817 |
| 2012/0084467 A1 | 4/2012 | Birnbaum et al. | |
| 2012/0124615 A1 | 5/2012 | Lee | |
| 2013/0014150 A1 | 1/2013 | Seo et al. | |
| 2013/0091524 A1 | 4/2013 | Hong | |
| 2014/0096084 A1 | 4/2014 | Kwon et al. | |
| 2015/0019342 A1* | 1/2015 | Gupta | G06Q 30/0269 705/14.66 |
| 2015/0271551 A1 | 9/2015 | Lee | |
| 2016/0034058 A1 | 2/2016 | Stauber et al. | |
| 2016/0142647 A1 | 5/2016 | Gopinath et al. | |
| 2017/0075516 A1 | 3/2017 | Park et al. | |
| 2017/0195612 A1 | 7/2017 | Yoon et al. | |
| 2017/0366862 A1 | 12/2017 | Ash et al. | |
| 2018/0027295 A1 | 1/2018 | Lee et al. | |
| 2018/0262793 A1 | 9/2018 | Lau et al. | |
| 2019/0349622 A1 | 11/2019 | Kim et al. | |
| 2020/0019563 A1 | 1/2020 | Moon et al. | |
| 2020/0053399 A1* | 2/2020 | Choi | H04N 21/4108 |
| 2020/0150829 A1 | 5/2020 | Park et al. | |
| 2020/0304883 A1 | 9/2020 | Choi et al. | |
| 2021/0014560 A1 | 1/2021 | Choi et al. | |
| 2021/0021660 A1* | 1/2021 | Lewis | H04L 65/764 |

FOREIGN PATENT DOCUMENTS

| | | |
|---|---|---|
| JP | 2008-109341 A | 5/2008 |
| JP | 2017-111833 A | 6/2017 |
| KR | 10-2012-0051967 A | 5/2012 |
| KR | 10-2015-0032852 A | 3/2015 |
| KR | 10-2017-0082008 | 7/2017 |
| KR | 10-2018-0010846 | 1/2018 |
| KR | 10-2018-0070217 A | 6/2018 |
| KR | 10-2019-0031032 A | 3/2019 |
| KR | 10-2019-0129222 A | 11/2019 |
| KR | 10-2019-0135958 A | 12/2019 |
| KR | 10-2020-0017295 A | 2/2020 |
| KR | 10-2020-0055433 A | 5/2020 |
| KR | 10-2021-0006595 A | 1/2021 |

OTHER PUBLICATIONS

Office Action issued by the Korean Patent Office on Aug. 7, 2024 for Korean Patent Application No. 10-2020-0075055.
International Search Report issued in International Application No. PCT/KR2021/007684 dated Sep. 24, 2021.
International Written Opinion issued in International Application No. PCT/KR2021/007684 dated Sep. 24, 2021.
Examination Report issued Mar. 6, 2025 for European Application No. 21 825 314.4.

* cited by examiner

ELECTRONIC DEVICE AND CONTROL METHOD THEREOF

CROSS-REFERENCE TO RELATED APPLICATION(S)

This application is a continuation application, under 35 U.S.C. § 111(a), of international application No. PCT/KR2021/007684, filed on Jun. 18, 2021, which claims priority to Korean Patent Application No. 10-2020-0075055, filed on Jun. 19, 2020, in the Korean Intellectual Property Office, the disclosures of which are incorporated by reference herein in their entirety.

BACKGROUND

Field

This disclosure relates to an electronic device and a control method thereof and, more particularly to, an electronic device that provides recommended content information corresponding to an external device and a control method thereof.

Description of Related Art

An electronic device for displaying content may be installed by receiving various applications from an external server. When an application is installed, the electronic device may be connected to an external server based on information included in the application and may receive and display content from an external server.

The electronic device may receive content by connecting to an external device rather than an application already installed in the electronic device. For example, the electronic device may be connected to a device (set-top box) that provides content to Internet protocol television (IPTV).

The electronic device may display content received from the set-top box, receive a user input, and transmit the user input to the set-top box. The set-top box may transmit a user input to an external server (content providers), and the set-top box may receive a screen or content corresponding to a user input and provide the received screen or content to the electronic device.

An operation of selecting a specific content or an operation of displaying a user interface (UI) recommending a specific content may be displayed on the screen provided by the content providers.

However, in the case where the content providers do not recommend the content or the content providers do not properly analyze the user's viewing history, the user may have a problem that the user does not have a high satisfaction with respect to the recommended content provided by the content providers.

SUMMARY

According to an embodiments, an electronic device includes a display, a communication interface; a memory to store recommended content information to be provided to a plurality of external devices; and a processor. The processor may be configured to control the communication interface to communicate with an external device, among the plurality of external devices, that provides content received from a plurality of content providers to the electronic device, control the display to display an image received from the external device, obtain identification information corresponding to the external device based on the image received from the external device, obtain recommended content information, among the recommended content information which is stored in the memory, corresponding to the external device that is identified based on the identification information obtained according to the image received from the external device, and control the display to display a user interface (UI) screen including the obtained recommended content information.

An electronic device according to an embodiment includes a display; a communication interface; a memory to store recommended content information for each external device; and a processor configured to control the communication interface to communicate with an external device, among the plurality of external devices, that receives content from a plurality of content providers and provides the content to the electronic device, based on a user command to display a user interface (UI) screen including information on the external device being input, obtain recommended content information related to the plurality of content providers connected to the external device based on information stored in the memory, and control the display to display a UI screen to which the external device and the obtained recommended content information are mapped. The information stored in the memory may be obtained based on viewing history information corresponding to the external device.

The communication interface may be a first communication interface and the electronic device may further include a second communication interface, and the processor may, based on a menu corresponding to the external device included in the UI screen being selected, control the display to display an image received from the external device, obtain identification information corresponding to the external device based on UI format information included in the displayed image, based on viewing history information related to the external device being obtained, map the obtained viewing history information with the identification information and store the mapped information in the memory, and control the second communication interface to transmit the information stored in the memory to an external server.

The processor may store device information comprising identification information for each external device and UI format information received from the external device through the second communication interface in the memory, and obtain identification information corresponding to the external device based on the device information stored in the memory and the UI format information included in the displayed image.

The UI format information stored in the memory may include information of a size of an object mapped to identification information of each external device, and the processor may identify size information of the object included in the displayed image, and obtain identification information corresponding to the external device by comparing the identified size information of the object and the size information of the object stored in the memory.

The UI format information stored in the memory may include horizontal and vertical length ratios of the object mapped to the identification information of each external device and configuration information related to a number of the object, and the processor may identify size information and number information of an object included in the displayed image, and obtain the identification information corresponding to the external device by comparing the identified size and number information of the object and the configuration information stored in the memory.

The UI screen may include information about a first external device and a second external device, the information about the first external device and the second external device may include menu information and recommended content information corresponding to each of the first external device and the second external device, the recommended content information related to the first external device may be information obtained based on viewing history information corresponding to the first external device, and the recommended content information related to the second external device may be information received from an external server.

The processor may, based on a menu corresponding to the external device included in the UI screen being selected, control the display to display an image received from the external device together with the UI screen.

The processor may obtain recommended content information related to the external device based on an image received from the external device, and control the display to display the UI screen comprising the recommended content information.

The electronic device may further include a second communication interface, and the processor may, based on a menu corresponding to the external device included in the UI screen being selected, control the display to display the image received from the external device, identify an object corresponding to a focused area corresponding to a user command among a plurality of objects included in the displayed image, obtain at least one of the content providers information or content information corresponding to the identified object, map at least one of the obtained content providers information or content information to the external device and store the information in the memory, and control the second communication interface to transmit the information stored in the memory to an external server.

The processor may, based on a menu corresponding to the external device included in the UI screen being selected, control the display to display the image received from the external device, identify at least one object among a plurality of objects included in the received image by analyzing the received image, and control the display to display a guide UI to recommend the identified at least one object.

The plurality of objects may include an image or a text for identifying content providers or contents, and the processor may identify an object corresponding to at least one of specific content providers or contents by analyzing each of the plurality of objects included in the received image.

A control method of an electronic device that stores recommended content information for each external device according to an embodiment includes controlling a communication interface to communicate with an external device that receives content from a plurality of content providers and provides the content to the electronic device; based on a user command to display a user interface (UI) screen including information on the external device being input, obtaining recommended content information related to the plurality of content providers connected to the external device based on the stored information; and displaying a UI screen to which the external device and the obtained recommended content information are mapped, and the stored information may be obtained based on viewing history information corresponding to the external device.

The method may further include, based on a menu corresponding to the external device included in the UI screen being selected, displaying an image received from the external device, The method may further include, obtaining identification information corresponding to the external device based on UI format information included in the displayed image; based on viewing history information related to the external device being obtained, mapping the obtained viewing history information with the identification information and storing the mapped information in a memory; and controlling the second communication interface to transmit the information stored in the memory to an external server.

The obtaining identification information corresponding to the external device may include storing device information comprising identification information for each external device and UI format information received from the external device through the second communication interface in the memory, and obtaining identification information corresponding to the external device based on the device information stored in the memory and the UI format information included in the displayed image.

The UI format information stored in the memory may include information of a size of an object mapped to identification information of each external device, the obtaining identification information corresponding to the external device may include identifying size information of the object included in the displayed image, and obtaining identification information corresponding to the external device by comparing the identified size information of the object and the size information of the object stored in the memory.

The UI format information stored in the memory may include horizontal and vertical length ratios of the object mapped to the identification information of each external device and configuration information related to a number of the object, and the obtaining identification information corresponding to the external device may include identifying size information and number information of an object included in the displayed image, and obtaining the identification information corresponding to the external device by comparing the identified size and number information of the object and the configuration information stored in the memory.

The UI screen may include information about a first external device and a second external device, the information about the first external device and the second external device may include menu information and recommended content information corresponding to each of the first external device and the second external device, the recommended content information related to the first external device may be information obtained based on viewing history information corresponding to the first external device, and the recommended content information related to the second external device may be information received from an external server.

The method may include, based on a menu corresponding to the external device included in the UI screen being selected, displaying an image received from the external device and the UI screen together.

The method may further include obtaining recommended content information related to the external device based on an image received from the external device, and displaying the UI screen comprising the recommended content information.

The method may further include, based on a menu corresponding to the external device included in the UI screen being selected, controlling the display to display the image received from the external device, identifying an object corresponding to a focused area corresponding to a user command among a plurality of objects included in the displayed image, obtaining at least one of the content providers information or content information corresponding to the identified object, mapping at least one of the obtained content providers information or content information to the external device and storing the information in the memory, and controlling the second communication interface to transmit the information stored in the memory to an external server.

BRIEF DESCRIPTION OF DRAWINGS

These and/or other aspects of the disclosure will become apparent and more readily appreciated from the following description of embodiments, taken in conjunction with the accompanying drawings of which.

DETAILED DESCRIPTION

Figure 1:
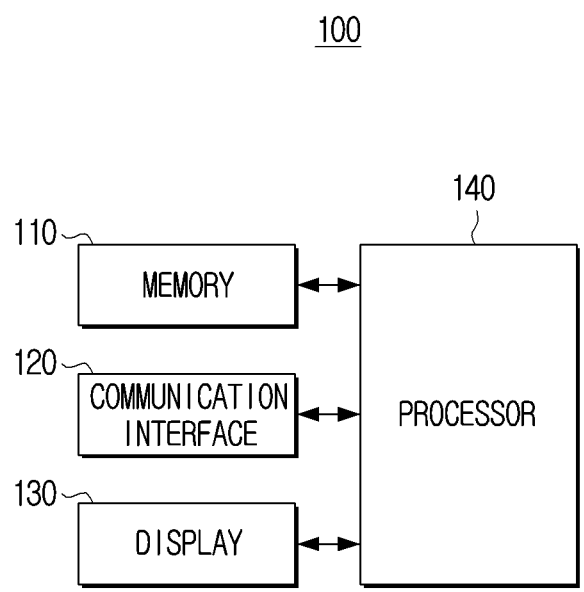
FIG. 1 is a block diagram illustrating an electronic device according to an embodiment of the disclosure.

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be arbitrarily selected, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through an intervening third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using an electronic apparatus or an artificial intelligence electronic apparatus using an electronic apparatus (e.g., artificial intelligence electronic apparatus).

The disclosure relates to an electronic device that identifies an external device based on a user interface (UI) screen displayed on a screen and provides a user with recommended content information corresponding to the identified external device and a control method thereof.

Hereinafter, various example embodiments of the disclosure will be described in greater detail.

FIG. 1 is a block diagram illustrating an electronic device according to an embodiment of the disclosure.

Referring to FIG. 1, an electronic device 100 may include a memory 110, a communication interface 120, a display 130, and a processor 140.

The electronic device 100 according to various embodiments may include at least one of, for example, and without limitation, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a medical device, a camera, a wearable device, or the like. A wearable device may include at least one of an accessory type (e.g., a watch, a ring, a bracelet, an ankle bracelet, a necklace, a pair of glasses, a contact lens or a head-mounted-device (HMD)); a fabric or a garment-embedded type (e.g.: electronic cloth); skin-attached type (e.g., a skin pad or a tattoo); a bio-implantable circuit, or the like. In some embodiments, the electronic device 100 may include at least one of, for example, and without limitation, a television, a digital video disk (DVD) player, an audio system, a refrigerator, air-conditioner, a cleaner, an oven, a microwave, a washing machine, an air purifier, a set top box, a home automation control panel, a security control panel, a media box (e.g., SAMSUNG HOMESYNC™, APPLE TV™, or GOOGLE TV™), a game console (e.g., XBOX™, PLAYSTATION™), an electronic dictionary, an electronic key, a camcorder, an electronic frame, or the like.

The electronic device 100 may be a display device. The display device may include various devices including a display. The electronic device 100 may include, for example, and without limitation, an electronic board, TV, desktop PC, notebook PC, smartphone, tablet PC, server, or the like. The above example is merely an example to describe an electronic device and the various embodiments are not necessarily limited thereto.

The memory 110 may be implemented as an internal memory such as, for example, and without limitation, a read-only memory (ROM) (for example, electrically erasable programmable read-only memory (EEPROM)), a random-access memory (RAM) or a memory separate from the processor 140. In this case, the memory 110 may be implemented as at least one of a memory embedded within the electronic device 100 or a memory detachable from the electronic device 100 according to the usage of data storage. For example, the data for driving the electronic device 100 may be stored in the memory embedded within the electronic device 100, and the data for upscaling of the electronic device 100 may be stored in the memory detachable from the electronic device 100.

A memory embedded in the electronic device 100 may be implemented as at least one of a volatile memory such as a dynamic random access memory (DRAM), a static random access memory (SRAM), a synchronous dynamic random access memory (SDRAM), or a non-volatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive (HDD) or a solid state drive (SSD). In the case of a memory detachably mounted to the electronic device 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a universal serial bus (USB) memory) connectable to the USB port, or the like.

Recommended content information for each external device may be stored in the memory 110. The recommended content may be different depending on the external device. This is because the content that may be provided through an external device is different. Identification information of a plurality of external devices may be stored in the memory 110, and recommended content information mapped to the identification information of the plurality of external devices may be stored. For example, the first external device may be mapped with the first recommendation content, and the second external device may be mapped with the second recommended content. According to an embodiment, the recommended content mapped to each external device may be different when the external devices are different. According to another embodiment, the recommended content mapped to each external device may be the same when the external device is different.

The communication interface 120 may communicate with other external devices using various types of communication methods. The communication interface 120 includes at least one of a wired communication module, Wi-Fi module, a Bluetooth module, an infrared communication module, a wireless communication module, or the like. The Wi-Fi module, Bluetooth module perform communication with Wi-Fi method, Bluetooth method, respectively.

The display 130 may be implemented as various types of displays such as a liquid crystal display (LCD) panel, organic light emitting diodes (OLED) display panel, a plasma display panel (PDP), and the like. In the display 130, a driving circuit of the display panel may be implemented using one or more of an a-Si thin film transistor (TFT), a low temperature poly silicon (LTPS) TFT, an organic TFT (OTFT), and a backlight. Further, the display 130 may be implemented as at least one of a touch screen coupled with a touch sensor, a flexible display, a three-dimensional (3D) display, or the like.

According to an embodiment, the display 130 may include not only a display panel to output an image but also a bezel that houses a display panel. In particular, the bezel according to an embodiment may include a touch sensor (not shown) for sensing a user interaction.

The processor 140 may control overall operations of the electronic device 100. The processor 140 may function to control overall operations of the electronic device 100.

The processor 140 may be implemented with at least one of a digital signal processor (DSP), a microprocessor, and a time controller (TCON), but is not limited thereto and may include a central processing unit (CPU), a micro controller unit (MCU), a micro processing unit (MPU), a controller, an application processor (AP), a graphics-processing unit (GPU), a communication processor (CP), and an advanced reduced instruction set computing (RISC) machine (ARM) processor or may be defined as a corresponding term. The processor 140 may be implemented in a system on chip (SoC) type or a large scale integration (LSI) type in which a processing algorithm is built therein or in a field programmable gate array (FPGA) type. The processor 140 may perform various functions by executing computer executable instructions stored in the memory 110.

The processor 140 may control a first communication interface 121 to perform communication with an external device which receives content from a plurality of content providers and provides the content to an electronic device. When a user command for displaying a UI screen including information about an external device is inputted, the processor 140 may obtain recommended content information related to the plurality of content providers connected to the external device based on the information stored in the memory 110 and may control the display 130 to display a UI screen to which the external device and the obtained recommended content information are mapped. The information stored in the memory 110 may be obtained based on viewing history information corresponding to the external device.

The content providers may mean a device (or server) providing content including at least one of image data or audio data.

The external device may receive content from at least one content provider and may transmit the received content to the electronic device 100. For example, the external device may be a set-top box or an over-the-top (OTT) device. According to an embodiment, an external device may perform a medium function for connecting a plurality of content providers and a user. For example, when a user selects one of a plurality of content providers, the external device may receive content desired by the user from the selected one content providers and transmit the content to the electronic device 100.

The processor 140 may communicate with an external device through the first communication interface 121. The first communication interface 121 may mean an HDMI interface. The HDMI interface may be made up of a wired communication module or a wireless communication module.

The processor 140 may receive a user input via a user interface 150. The user input may be a control command for controlling to perform a specific operation, and the specific operation may be an operation of controlling to display a UI including information on an external device. Here, the information on the external device may include information related to at least one information related to at least one content providers, information related to a plurality of content which may be provided by at least one content providers, or recommended content information corresponding to an external device.

When a user command for displaying a UI screen including information about an external device is input, the processor 140 may control the display 130 to display a UI screen including information on the external device. When a user command is input, the processor 140 may obtain identification information of the external device. The processor 140 may obtain recommended content information corresponding to the obtained identification information of the external device. The processor 140 may control the display 130 to display a UI screen including the obtained recommended content information. The UI screen may include an UI in which an external device (or identification information of an external device) is mapped to the recommended content corresponding to the external device.

The recommended content information corresponding to the identification information of the external device may refer to information related to at least one of content among a plurality of content receivable from a plurality of content providers connectable through an external device.

For example, it is assumed that a first external device may be connected to first content providers and second content providers, the first content providers may provide first-1 content and second-2 content, and second content providers may provide second-1 content and second-2 content. Here, the recommended content corresponding to the external device may be first-1 content. If it is identified that the first external device is connected to the electronic device 100, the processor 140 may control the display 130 to display information related to the first-1 content which is the recommendation content corresponding to the first external device. In addition, the processor 140 may display a screen on which the first external device and the first-1 content are displayed together.

The information stored in the memory 110 may mean recommended content information for each external device. Recommended content information may be different according to an external device. In the first external device, the first-1 content may be determined as the recommendation content, but the second-1 content may be determined as the recommended content in the second external device. The content information for each external device may be obtained by viewing history information corresponding to an external device. For example, it is assumed that a user frequently watches the first-1 content through the first external device and the user frequently watches the second-1 content through the second external device. The recommended content corresponding to the first external device may be determined as the first-1 content, and the recommended content corresponding to the second external device may be determined as the second-1 content. The viewing history information may be stored in the memory 110, and the viewing history information may be stored differently according to external devices. The viewing history information may be distinguished by the identification information of the external device, and recommended content information corresponding to the identification information of the distinguished external device may be determined. The memory 110 may map and store identification information of an external device and recommended content information. For example, the memory 110 may map external device-first-1 content and map and store second external device-second-1 content.

The electronic device 100 may further include a second communication interface 122. When a menu corresponding to an external device included in the UI screen is selected, the processor 140 may control the display 130 to display the image received from the external device, obtain identification information corresponding to the external device based on UI format information included in the displayed image, map the obtained viewing history information to the identification information and store the information in the memory 110 when viewing history information related to the external device is obtained, and control the second communication interface 122 to transmit the information stored in the memory 110 to the external server.

The processor 140 may display the UI on the display 130. The UI screen may include a menu corresponding to an external device. When the processor 140 receives a user input for selecting a menu corresponding to an external device from a user, the processor 140 may display an image received from the external device. An image received from an external device may refer to a screen provided by an external device. Specifically, the screen may be a screen including at least one content providers which may be provided by an external device, or a screen including at least one content list which may be provided by at least one content providers. For example, a screen provided by an external device may be a screen 710 of FIG. 7, a screen 810 of FIG. 8, and a screen 910 of FIG. 9.

The UI may include UI format information. Here, the UI format information may refer to information related to various objects constituting a UI screen. For example, the UI format information may include information such as the location, size, number, shape, and the like of at least one object included in the UI screen. The screen 710 and a screen 720 of FIG. 7 may be screens having different UI format information. That is, when an external device "A" is connected to the electronic device 100, the processor 140 may display a screen 710, and when the external device "B" is connected to the electronic device 100, the processor 140 may display a screen 720. The processor 140 may pre-store the screen information (UI format information) provided by the external device in the memory 110 and analyze the screen displayed on the display 130 to identify whether the screen is a screen provided by which external device.

Specifically, UI format information may be identified by analyzing a screen displayed on the display 130, and UI format information identified on a currently displayed screen and UI format information stored in the memory 110 may be compared. When the UI format information identified on the currently displayed screen matches the UI format information stored in the memory 110, the processor 140 may obtain identification information of an external device corresponding to the matched UI format information. The processor 140 may specify an external device connected to the current electronic device 100 only with the screen displayed on the display 130.

When viewing history information using an external device is obtained after an external device connected to the current electronic device 100 is specified, the processor 140 may map and store identification information and viewing history information of the external device. The processor 140 may transmit the mapped information (external device identification information-viewing history information) to an external server through the second communication interface 122.

The second communication interface 122 may mean a LAN module.

The external server may refer to a device for mapping and storing identification information of a plurality of external devices and UI format information corresponding to a plurality of external devices. The external server may periodically update UI format information corresponding to the external device, and transmit the updated information to the electronic device 100. The electronic device 100 may receive UI format information of a screen provided by an external device through an external server, and may perform a comparison operation based on the received UI format information for each external device.

For example, when a screen 710 is displayed on the display 130, the processor 140 may analyze UI format information of the screen 710 to identify that the screen 710 is a screen provided by the external device "A". When a user receives information for viewing the first content by using an external device "A", the processor 140 may map the first content with an external device "A" and store the same in the memory 110. The processor 140 may transmit the mapped information (external device "A"—first content) to an external server through the second communication interface 122.

The processor 140 may store device information including identification information for each external device and UI format information received from an external server through the second communication interface 122 in the memory 110, and obtain identification information corresponding to the external device based on the device information stored in the memory 110 and UI format information included in the displayed image.

The processor 140 may receive the device information through the external server and store the device information in the memory 110, and the device information may mean information to which the identification information of the external device and the UI format information are mapped. For example, the device information may be information indicating that the device "A" includes a search window object and a 3*3 content providers list object. Accordingly, the processor 140 may identify that the external device connected to the current electronic device 100 is a device "A" when the search window object and the 3*3 content providers list object are included on the screen displayed on the display 130 and the position thereof matches. Here, the identification information of the external device may mean a unique identification number of the device "A".

The UI format information stored in the memory 110 includes the size information of the object mapped to the identification information of each external device. The processor 140 may identify the size information of the object included in the displayed image and compare the size information of the identified object and the size information of the object stored in the memory 110 to obtain the identification information corresponding to the external device.

The size information of the object may include at least one of shape information of the object, horizontal length information of the object, or vertical length information of the object. The processor 140 may obtain a shape, a horizontal length, and a vertical length of an object included in a screen displayed on the display 130. The information may be compared to the information stored in the memory 110 to identify whether there is information corresponding to the obtained shape, the horizontal length, and the vertical length. If information matching the obtained shape, the horizontal length, and the vertical length is stored in the memory 110, the processor 140 may obtain identification information of the external device corresponding to the matched information.

The UI format information stored in the memory 110 may include the ratio of the horizontal and vertical lengths of the object mapped to the identification information of each external device and the configuration information related to the number of objects. The processor 140 may identify the size information and the number information of the object included in the displayed image, and compare the size and number information of the identified object and the configuration information stored in the memory 110 to obtain identification information corresponding to the external device.

Here, the ratio of the horizontal and vertical lengths of the object may mean a value obtained by dividing the horizontal length of a specific object by a vertical length or a value obtained by dividing the vertical length of a specific object by a horizontal length. The configuration information related to the number of objects may mean information about with which configuration an object having the same ratio is to be displayed on a screen. The configuration information refers to matrix information in the form of x*y. The configuration information may refer to information related to a 3*3 content providers list and a 3*3 content list.

For example, when it is identified that the screen 710 being displayed on the display 130 includes a 3*3 content providers list, the processor 140 may identify that the external device connected to the electronic device 100 is an external device "A". When it is identified that the screen 720 displayed on the display 130 includes a 4*5 content providers list, the processor 140 may identify that an external device connected to the electronic device 100 is an external device "B".

The UI screen may include information about the first external device and the second external device and the information about the first external device and the second external device may include menu information and recommended content information corresponding to each of the first external device and the second external device, and the recommended content information for the first external device is information obtained based on viewing history information corresponding to the first external device, and recommended content information for the second external device may be information received from an external server.

Recommended content information may be obtained by another method according to an external device. For example, it is assumed that the first external device has already been connected to the electronic device 100 and the user has used the first external device a lot and the viewing history information has been already stored in the memory 110, and that the second external device has not been connected to the electronic device 100 so that viewing history information is not stored in the memory 110.

When the first external device is connected to the electronic device 100, the processor 140 may obtain recommended content information corresponding to the first external device based on viewing history information corresponding to the first external device stored in the memory 110.

When the second external device is connected to the electronic device 100, the processor 140 may determine that there is no viewing history information corresponding to the second external device in the memory 110. If viewing history information corresponding to the second external device is not stored in the memory 110, the processor 140 may generate a control command for requesting recommended content information corresponding to the second external device and transmit the generated control command to the external server. The processor 140 may obtain recommended content information corresponding to the second external device from an external server. According to an embodiment, the operation of generating the control command and transmitting the control command to the external server may be after the second external device is connected to the electronic device 100, and according to another embodiment, the operation may be before the second external device is connected to the electronic device 100.

When a menu corresponding to an external device included in the UI screen is selected, the processor 140 may control the display 130 to display the image received from the external device and the UI screen together.

The image received from the external device may refer to at least one screen among screens including a content providers list connectable through an external device or a screen including a content list receivable through an external device. The UI screen may be a screen on which recommended content information corresponding to an external device and an external device are displayed together. A detailed description related thereto will be described later with reference to FIG. 13.

The processor 140 may obtain recommended content information related to an external device on the basis of an image received from an external device, and control the display 130 to display a UI screen including recommended content information.

Figure 13:
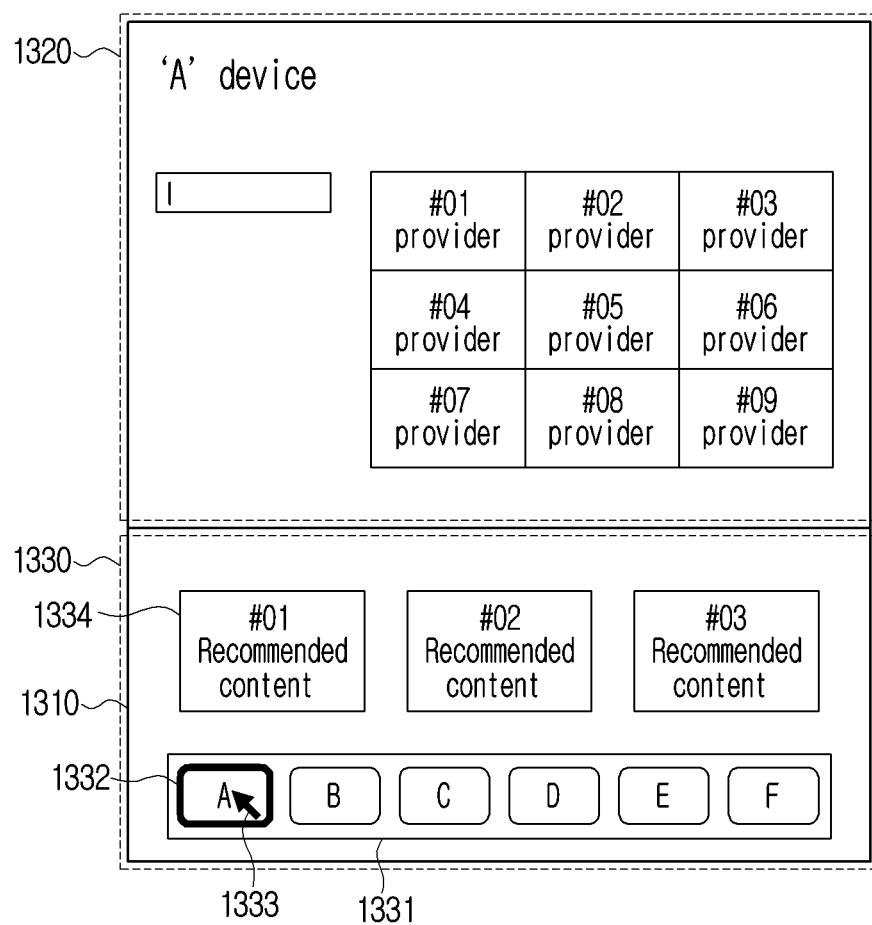
FIG. 13 is a diagram illustrating an operation of displaying a screen provided by an external device and a screen provided by an electronic device simultaneously according to an embodiment of the disclosure.

The processor 140 may receive a screen 1320 of FIG. 13 from an external device and display the received screen 1320 on the display 130. The processor 140 may obtain identification information of an external device connected to the electronic device 100 on the basis of UI format information included in the screen 1320. The processor 140 may obtain recommended content information corresponding to the obtained identification information. The processor 140 may display the obtained identification information and the obtained recommended content information on a UI screen 1330. The processor 140 may simultaneously display a screen 1320 received from an external device and a UI screen 1330 on one screen 1310.

The processor 140 may control the display 130 to display an image received from an external device when a menu corresponding to an external device included in the UI screen is selected, identify an object corresponding to the focused area according to a user command among a plurality of objects included in the displayed image, obtain at least one of the content providers information corresponding to the identified object or content information, map at least one of the obtained content providers information or the content information to an external device, store the same in the memory 110, and control the second communication interface 122 to transmit the information stored in the memory 110 to the external server.

The focused area may mean an area of a position of an object selected by a user currently. A detail will be described in FIGS. 8 and 9.

When a menu corresponding to an external device included in the UI screen is selected, the display 130 may control the display 130 to display an image received from the external device, analyze the received image to identify at least one object among a plurality of objects included in the received image, and control the display 130 to display a guide UI for recommending the identified at least one object.

The guide UI may mean an UI for recommending specific content providers or specific contents to a user and a detail will be described in FIGS. 14 and 15.

The plurality of objects may include at least one of an image or a text for identifying content providers or content, and the processor 140 may analyze each of a plurality of objects included in the received image to identify an object corresponding to at least one of a specific content providers or content corresponding to the recommended content.

The processor 140 may obtain all text information (or image information) included in an image received from an external device. When there is text information (or image information) corresponding to the recommended content corresponding to the external device among the obtained text information (or image information), the processor 140 may display a guide UI in an area corresponding to the matched text information (or image information).

The electronic device 100 may directly receive identification information corresponding to an external device from an external device through an HDMI or the like. When a format transmitted from an external device is not compatible with the electronic device 100, the processor 140 may simply display an image received from the external device on the display 130 but may not analyze an image provided by the external device. The electronic device 100 may simply display predetermined recommended content corresponding to the external device or display only the recommended content provided by the external device on the display 130.

However, the electronic device 100 according to an embodiment of the disclosure may specify an external device by analyzing an image (or a screen) provided by an external device, determine recommended content information corresponding to a specified external device directly by the electronic device 100, and provide a guide UI or the like, so that a subject providing a service to the user may be clearly identified as the electronic device 100. The electronic device 100 may improve user satisfaction by providing various services to a user and analyze user viewing history by using viewing history information of various external devices.

It has been illustrated and described a simple configuration of the electronic device, but in implementation, various configurations may be additionally provided. This will be described below with reference to FIG. 2.

Figure 2:
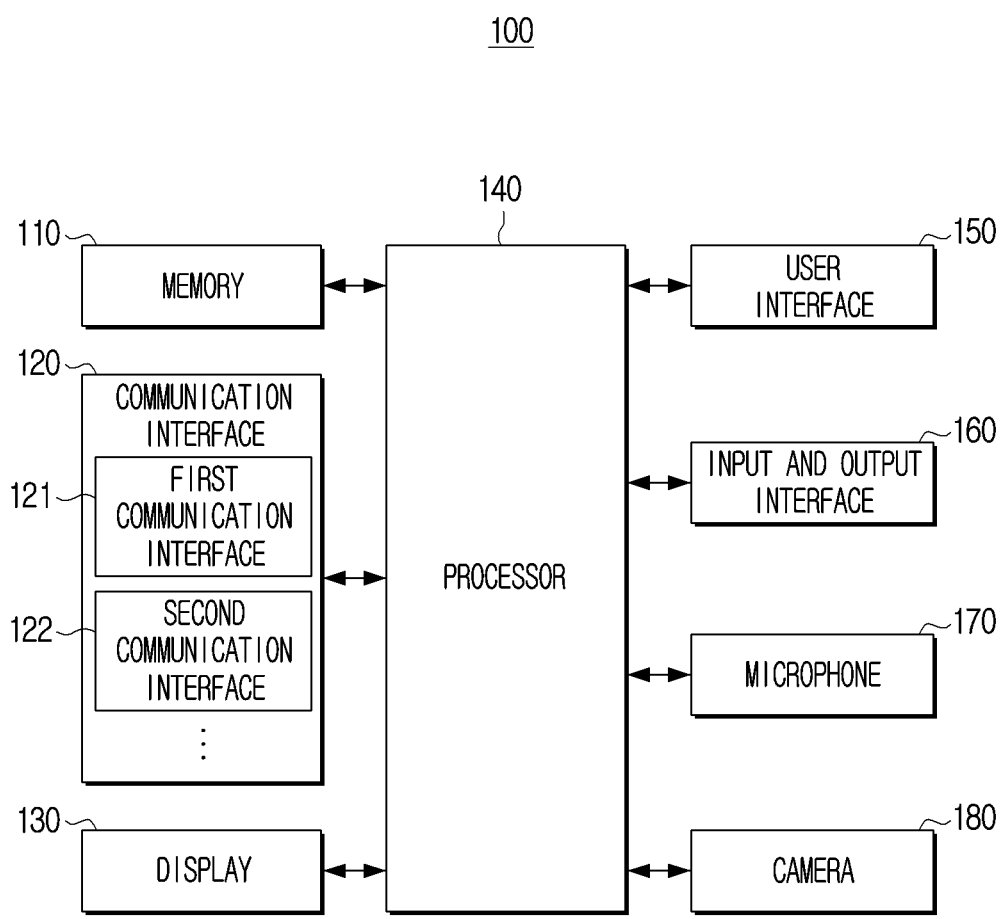
FIG. 2 is a block diagram illustrating a specific configuration of the electronic device of FIG. 1 according to an embodiment of the disclosure.

FIG. 2 is a block diagram illustrating a specific configuration of the electronic device of FIG. 1.

Referring to FIG. 2, the electronic device 100 may include the memory 110, the communication interface 120, the display 130, the processor 140, a user interface 150, an input and output interface 160, a microphone 170, and a camera 180.

The operations which are the same as the above operations of the memory 110, the communication interface 120, the display 130, and the processor 140 will not be further described.

The communication interface 120 may communicate with other external devices using various types of communication methods. The communication interface 120 includes at least one of a Wi-Fi module, a Bluetooth module, an infrared communication module, a wireless communication module, or the like. Each communication module may be implemented as or include at least one hardware chip.

Here, the first communication interface 121 and the second communication interface 122 may refer to respective modules communicating with an external device (or an external server) in different ways. For example, the first communication interface 121 may be a wired communication module and the second communication interface 122 may be a wireless communication module. As another example, the first communication interface 121 may be a wired communication module using a digital cable, and the second communication interface 122 may be a wired communication module using a LAN module.

The processor 140 may perform a graphic processing function (e.g., video processing function). For example, the processor 140 may generate a screen including various objects such as icons, images, text, and the like using a calculator (not shown) and a renderer (not shown). Here, a calculator may calculate an attribute value such as a coordinate value, a shape, a size, and a color to be displayed by each object according to the layout of the screen based on the received control command. A renderer may generate display screens of various layouts including objects based on the attribute value calculated by the calculator. The processor 140 may perform various image processing such as at least one of decoding, scaling, noise filtering, frame rate conversion, resolution conversion, or the like, for the video data.

The processor 140 may perform processing for the audio data. The processor 140 may perform various image processing such as at least one of decoding, scaling, noise filtering, or the like, for the audio data.

The user interface 150 may include various interface circuitry and be implemented with a device such as, for example, and without limitation, at least one of a button, a touch pad, a mouse, a keyboard, or a touch screen capable of performing the above-described display function and operation input function. The button may be various types of buttons such as at least one of a mechanical button, a touch pad, a wheel, or the like, formed in an arbitrary area such as at least one of a front portion, a side portion, a back portion, or the like, of the outer surface of the main body of the electronic device 100.

The input and output interface 160 may be one of the interfaces, such as, for example, and without limitation, at least one of a high-definition multimedia interface (HDMI), mobile high-definition link (MHL), universal serial bus (USB), display port (DP), Thunderbolt, video graphics array (VGA) port, RGB port, d-subminiature (D-SUB), digital visual interface (DVI), and the like.

The input and output interface 160 may input or output at least one of an audio signal and a video signal.

According to an embodiment, the input and output interface 160 may include a port for inputting or outputting an audio signal or a video signal separately, or may be implemented as one port that inputs or outputs all the audio signals or video signals.

The input and output interface 160 may be recited as an interface included in the communication interface 120.

The microphone 170 may receive the user voice in an active state. For example, the microphone may be integrally formed as an integral unit on at least one of an upper side, a front side direction, a side direction, or the like of the electronic device 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

The camera 180 is configured to generate a captured image by capturing an image of a subject, wherein the captured image includes both a moving image and a still image.

The camera 180 may obtain an image of at least one external device and may be implemented as a camera, a lens, an infrared sensor, and the like.

The electronic device 100 may further include at least one of a tuner and a demodulator, according to an implementation example.

The tuner may receive a radio frequency (RF) broadcast signal by tuning a channel selected by a user or all the prestored channels, among the RF broadcast signal received through an antenna.

The demodulator may receive and demodulate a digital intermediate frequency (DIF) signal converted by the tuner and perform channel decoding, or the like.

Figure 3:
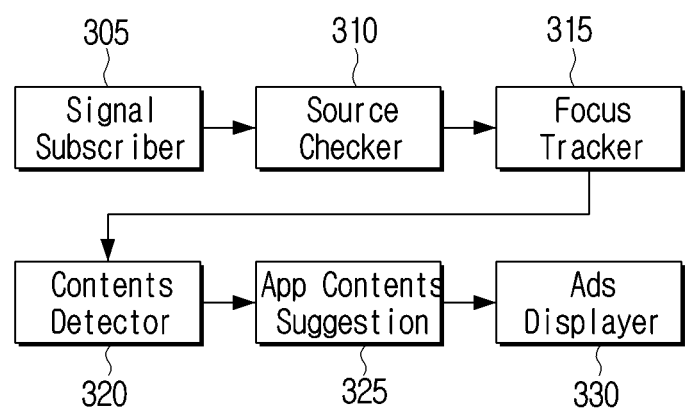
FIG. 3 is a diagram illustrating a control module of an electronic device according to an embodiment of the disclosure.

FIG. 3 is a diagram illustrating a control module of an electronic device according to an embodiment of the disclosure.

Referring to FIG. 3, the control module of the electronic device may include at least one of a signal subscriber 305, a source checker 310, a focus tracker 315, a contents detector 320, an app contents suggestion 325, or an ads displayer 330.

The signal subscriber 305 may detect a signal of an external device wired or wirelessly connected to the electronic device 100. Specifically, the signal subscriber 305 may determine whether a screen displayed on a display 130 of the electronic device 100 is provided in an external device. The signal subscriber 305 may determine whether to display a screen (for example, a screen that may be displayed without being connected to an external server) stored in the memory or a content or a broadcast screen received from the external device. The signal subscriber 305 may also identify how the signal the external device is providing is received. For example, the signal subscriber 305 may identify whether an external device is connected via a wired LAN or a USB terminal.

The source checker 310 may determine a subject providing information on a currently displayed screen. The source checker 310 may determine whether a currently displayed screen is an external device pre-stored in the electronic device 100. For example, the electronic device 100 may store identification information of a plurality of external devices having a connection history. The source checker 310 may compare the identification information of the external device connected to the current electronic device 100 with the identification information of the external device prestored in the memory. If the identification information of the external device connected to the current electronic device 100 is pre-stored in the memory, the electronic device 100 may provide recommended content information corresponding to the identification information of the external device. If the identification information of the external device connected to the electronic device 100 is not prestored in the memory, the electronic device 100 may display a guide UI asking whether to register the identification information of the external device on the display 130.

The focus tracker 315 may identify a focus area on a screen displayed on the display 130. Since the position of the focus area may be changed according to a user input, the focus tracker 315 may identify a focus area that changes in real time. For example, the focus tracker 315 may identify the rectangular-shaped focus area 811 of FIG. 8.

A contents detector 320 may analyze at least one of a text or an image corresponding to a focus area identified by the focus tracker 315. For example, the contents detector 320 may obtain text information "#01 provider" by analyzing a rectangular focus area.

The app (application) contents suggestion 325 may obtain recommended application information suitable for a user on the basis of pre-stored viewing history information. If there is no previously stored viewing history information, a predetermined application may be obtained. Here, the predetermined application may include at least one of a new application, a most selected application, or an application predetermined by an external device manufacturer. The contents suggestion 325 may obtain recommended content information suitable for a user on the basis of pre-stored viewing history information. If there is no prestored viewing history information, predetermined recommended content information may be obtained. Here, the predetermined recommended content may include at least one of new content, most selected content, or content predetermined by an external device manufacturer (or content providers).

The ads displayer 330 may provide the user with information about the recommended application or the recommended content obtained by the app contents suggestion 325. Specifically, the ads displayer 330 may display at least one of information on a recommended application or recommended content at a predetermined location of a screen displayed by the display 130.

Figure 4:
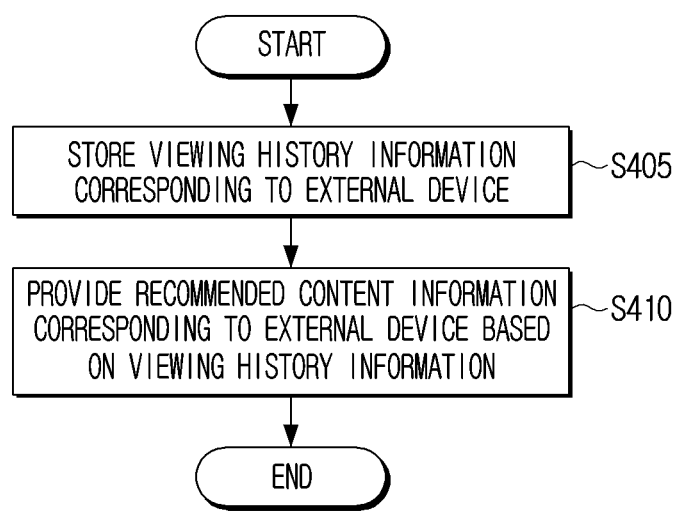
FIG. 4 is a flowchart illustrating a control method of an electronic device according to an embodiment of the disclosure.

FIG. 4 is a flowchart illustrating a control method of an electronic device according to an embodiment of the disclosure.

Referring to FIG. 4, the electronic device 100 may store viewing history information corresponding to an external device in operation S405. The electronic device 100 may obtain viewing history information by determining which content providers are selected or which content is viewed by the user on the basis of a user input (or user selection). For example, the viewing history information may include information related to content that the user of the electronic device 100 watched for a preset period. For example, the viewing history information may include at least one of a content name, a content type, and content providers.

The electronic device 100 may provide recommended content information corresponding to an external device based on viewing history information in operation S410. The electronic device 100 may identify content suitable for the user on the basis of viewing history information and provide recommended content information related to the identified content to the user.

Figure 5:
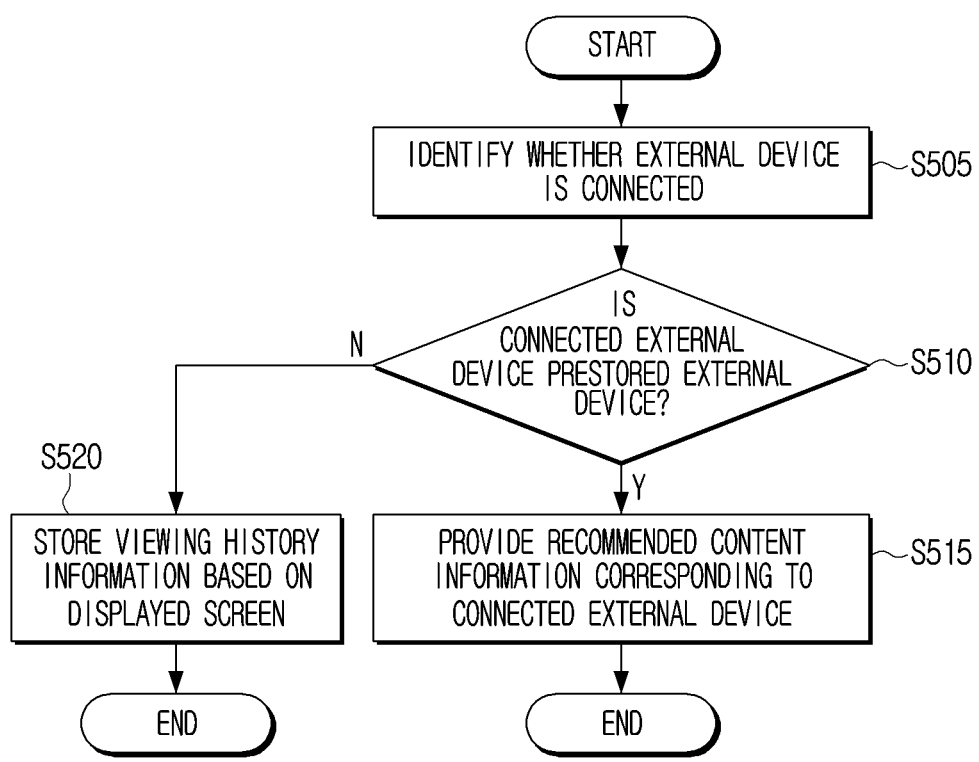
FIG. 5 is a flowchart illustrating an operation of determining whether a connected external device is prestored according to an embodiment of the disclosure.

FIG. 5 is a flowchart illustrating an operation of determining whether a connected external device is prestored.

Referring to FIG. 5, the electronic device 100 may identify whether an external device is connected in operation S505. The electronic device 100 may determine whether an external device is connected through at least one of the communication interface 120 or the input and output interface 160. When the external device is connected to the electronic device 100, the electronic device 100 may receive content through an external device. According to an embodiment, the electronic device 100 may check whether an external device is connected at a time when the external device is connected to the electronic device 100 from a state of not being connected to the electronic device 100. According to another embodiment, the electronic device 100 may check whether the external device as in operation S505 is connected at a time when a user command (for example, a user inputs a specific button) is received.

When the external device is connected to the electronic device 100, the electronic device 100 may determine whether the external device is an external device pre-stored in the memory 110 of the electronic device 100 in operation S510. The electronic device 100 may store identification information about an external device connected to the electronic device 100 in the memory 110.

Here, if an external device connected to the electronic device 100 is an external device pre-stored in the memory 110, the electronic device 100 may provide recommended content information corresponding to the connected external device to the user in operation S515.

If an external device connected to the electronic device 100 is not an external device pre-stored in the memory 110, the electronic device 100 may store viewing history information on the basis of a screen displayed on the display 130 in operation S520. The electronic device 100 may receive screen information from an external device. The electronic device 100 may display screen information received from the external device on the display 130. The electronic device 100 may obtain viewing history information of a user by analyzing a screen displayed on the display 130. In addition, the electronic device 100 may store the obtained user's viewing history information in the memory 110.

In FIG. 5, the electronic device 100 provides recommended content information on the basis of viewing history information only when the electronic device 100 corresponds to an external device pre-stored in an external device.

According to another embodiment, predetermined recommended content information may be provided instead of step S520. The predetermined recommended content information may mean predetermined content information regardless of the user's viewing history information. However, there is a need to know whether the external device provides the corresponding content in advance. If an external device may not provide predetermined recommended content, it may be meaningless to provide predetermined recommended content information. Therefore, the electronic device 100 may receive identification information and UI format information corresponding to a plurality of external devices from an external server so that even an external device not connected to the electronic device 100 may obtain identification information. At least one content providers and a content list which may be provided by an external device corresponding to the identification information may be received. The electronic device 100 may obtain identification information of an external device connected to the electronic device 100 by comparing UI format information included in a screen provided by the connected external device with UI format information received from an external server. If the UI format information included in the screen provided by the connected external device matches the UI format information received from the external server, recommended content information may be obtained based on the identification information corresponding to the matched UI format information. The electronic device 100 may provide the obtained recommended content information to a user.

Figure 6:
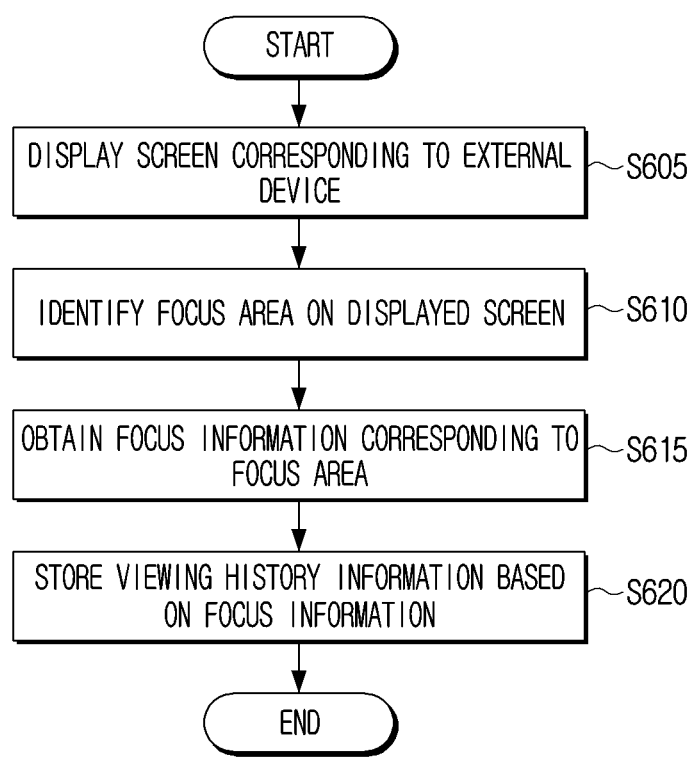
FIG. 6 is a flowchart illustrating an operation of obtaining focus information according to an embodiment of the disclosure.

FIG. 6 is a flowchart illustrating an operation of obtaining focus information.

Referring to FIG. 6, the electronic device 100 may display a screen corresponding to an external device in operation S605. The electronic device 100 may receive screen information from an external device and display a specific screen on the display 130 based on the received screen information.

The electronic device 100 may identify a focus area on a screen displayed on the display 130 in operation S610. The focus area may refer to an area in which the current user is focusing among the entire areas of the screen. For example, the focus area may refer to an area in which a background color, an edge, an object size, and the like are displayed differently from other objects such that one object among the plurality of objects may be focused. For example, the focus area may be the area 811 of FIG. 8 or an area 911 of FIG. 9.

The electronic device 100 may obtain focus information corresponding to the focus area in operation S615. The focus information may refer to text information or image information included in a focus area. The electronic device 100 may obtain at least one of text information or image information by using an OCR or an ACR with respect to a focus area. For example, the electronic device 100 may obtain text information "#01 provider" by applying an OCR or ACR technology with respect to the focus area 811.

There may be cases where the focus area is changed according to the movement of an arrow or a cursor. Therefore, when OCR or ACR is used for all changed focus areas, the processing processor may have a burden, and unnecessary data may be stored. Therefore, the electronic device 100 may control to obtain focus information corresponding to the focus area only when the focus area is maintained for more than or equal to a preset time. For example, when the current focus area is maintained for five seconds or more, OCR or ACR may be performed in the focus area.

The electronic device 100 may store viewing history information based on the obtained focus information in operation S620. The focus information may mean information on an area where a user prefers or has an interest. The electronic device 100 may store the focus information in the memory 110 as viewing history information.

Figure 7:
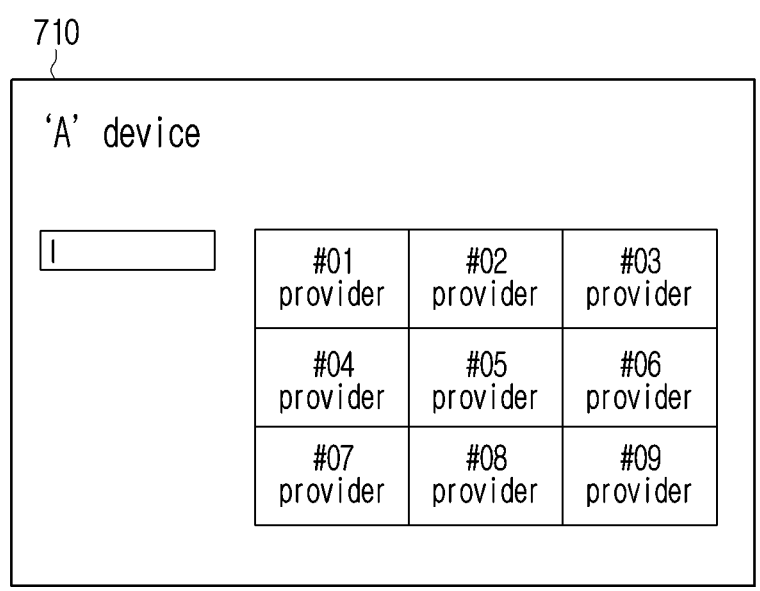
FIG. 7 is a diagram illustrating a UI format provided by an external device according to an embodiment of the disclosure.
Figure 7:
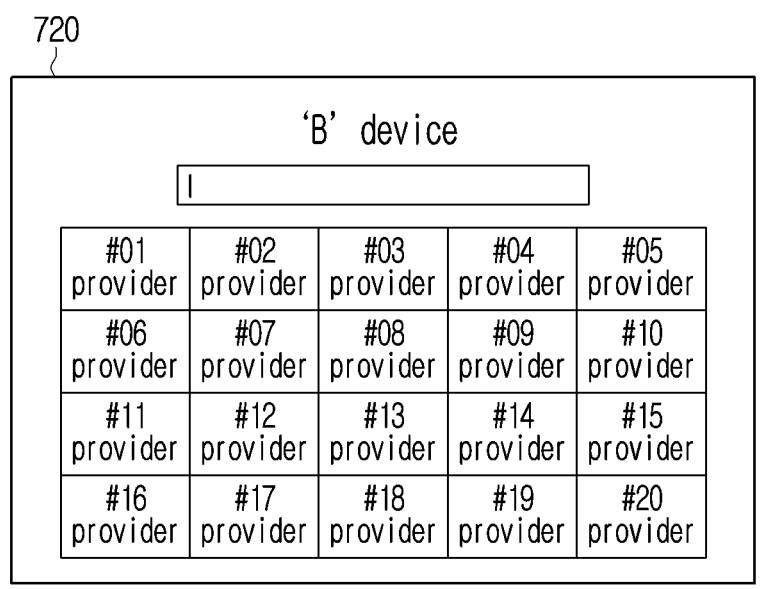

FIG. 7 is a diagram illustrating a UI format provided by an external device.

Referring to FIG. 7, the electronic device 100 may display a screen including various UI format information on the display 130 according to the type of the external device. If the external device is different, screen information provided by the external device may be different, and if the screen information provided by the external device is different, the UI format information provided by the external device may be different.

The screen 710 may include UI format information provided by an external device (A device) according to an embodiment. The screen 710 may include a manufacturer name of an external device on the uppermost left, a search box on the left of the center, and a list of content providers on the right of the center. Here, the content providers list may be displayed in the form of 3*3.

The screen 720 may include UI format information provided by the external device (B device) according to another embodiment. The screen 720 may include a manufacturer name of the external device in the upper center, a search box just below the manufacturer name, and a list of content providers under the search box. Here, the content providers list may be displayed in the form of 4*5.

Figure 8:
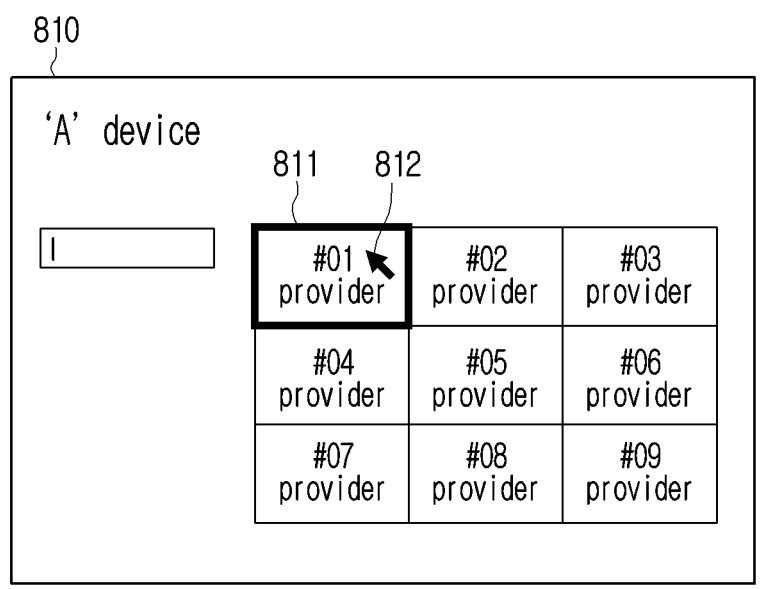
FIG. 8 is a diagram illustrating a focus area according to an embodiment of the disclosure.

FIG. 8 is a diagram illustrating a focus area according to an embodiment of the disclosure.

Referring to FIG. 8, a user may move a cursor 812 on a screen 810 displayed on the display 130. The electronic device 100 may identify a position of the cursor 812 displayed on the screen 810 based on a user input, and may identify a focus area based on the identified position of the cursor 812. The electronic device 100 may identify an object corresponding to the coordinates at which the identified cursor 812 is located, and identify an area in which the identified object is displayed as the focus area 811.

The focus area 811 and the cursor 812 according to an embodiment may be a UI provided by an external device.

The focus area 811 and the cursor 812 according to another embodiment may be a UI provided by the electronic device 100.

Although the cursor 812 is displayed in FIG. 8, only the focus area 811 may be displayed on the screen 810 without the cursor 812 according to an implementation example. Unlike other objects, when the thickness of the edge of a specific object, the edge color, or the object background color is different from the other objects, the electronic device 100 may identify an area corresponding to the object as the focus area.

Figure 9:
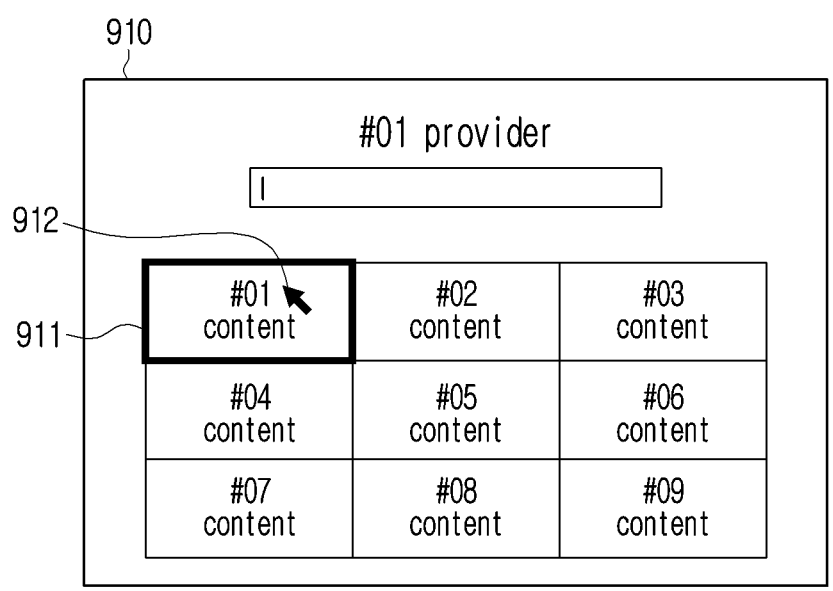
FIG. 9 is a diagram illustrating a focus area according to another embodiment of the disclosure.

FIG. 9 is a diagram illustrating a focus area according to another embodiment of the disclosure.

Referring to FIG. 9, the user may select specific content providers from the list of content providers on the screen 810. When the user selects specific content providers, the electronic device 100 may display a screen corresponding to the selected content providers on the display 130. For example, it is assumed that the user has selected the focused "#01 provider" in FIG. 8. The electronic device 100 may transmit a user input (or selection) to an external device, and the external device may provide screen information according to the user input to the electronic device 100. The electronic device 100 may receive and display the screen 910 corresponding to "#01 provider" from an external device.

The screen 910 may include content providers in the upper center, a search box below the position where content providers are displayed, and a content list in the lower center. Here, the content list may be displayed in a 3*3 format.

The screen 910 may include a focus area 911 and a cursor 912. As described with reference to FIG. 8, the cursor 912 may not be displayed on the screen 910 according to an embodiment. Since other descriptions have been described in FIG. 8, redundant descriptions will be omitted.

Figure 10:
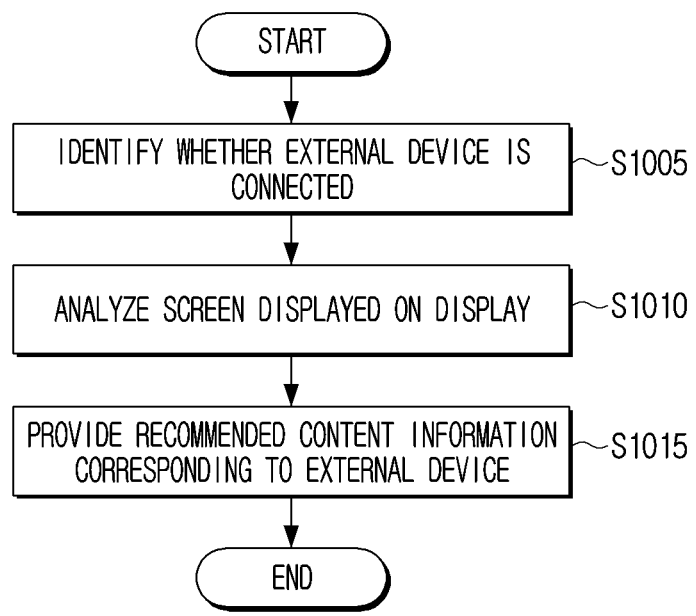
FIG. 10 is a flowchart illustrating an operation of providing recommended content information according to an embodiment of the disclosure.

FIG. 10 is a flowchart illustrating an operation of providing recommended content information.

Referring to FIG. 10, the electronic device 100 may check whether an external device is connected to the electronic device 100 in operation S1005. The operation S1005 may correspond to S505 of FIG. 5 and a redundant description will be omitted.

The electronic device 100 may analyze the screen displayed on the display 130 in operation S1010. The electronic device 100 may receive screen information from an external device and display the information on the display 130. The electronic device 100 may obtain identification information of the external device by analyzing the displayed screen.

Specifically, the electronic device 100 may obtain identification information of the external device by analyzing UI format information of the displayed screen.

The electronic device 100 may provide recommended content information corresponding to an external device to a user in operation S1015.

According to an embodiment, the electronic device 100 may provide a user with recommended content information according to viewing history information prestored in the memory 110 and identification information of an external device connected.

According to another embodiment, the electronic device 100 may provide the user with predetermined recommended content information based on the identification information of the connected external device and the content list mapped to the identification information.

When the electronic device 100 obtains identification information of the external device, the electronic device 100 may obtain a content providers list that may be connected through the external device and a list of content that may be provided by each content provider based on the information stored in the memory 110. Accordingly, the electronic device 100 may store identification information corresponding to a plurality of external devices, a list of content providers mapped to each identification information, and a list of contents in the memory 110. When the electronic device 100 obtains the identification information of the external device, it is possible to identify content that may be provided by the external device based on the obtained identification information and a content list mapped to the identification information.

The content list may be associated with the content providers. For example, content providers may provide #01 content to #10 content, and a B content providers may provide #11 content to #20 content. Here, it is assumed that the recommended content is #01 content. When the content information of #01 is recommended, the electronic device 100 may provide only information about #01 content to the user. However, recommended content information should include not only information on the #01 content but also information on the A content providers. This is because the B content providers cannot provide #01 content. Taking this into reflection, in the recommended content information, the content providers and content may be mapped and included.

Figure 11:
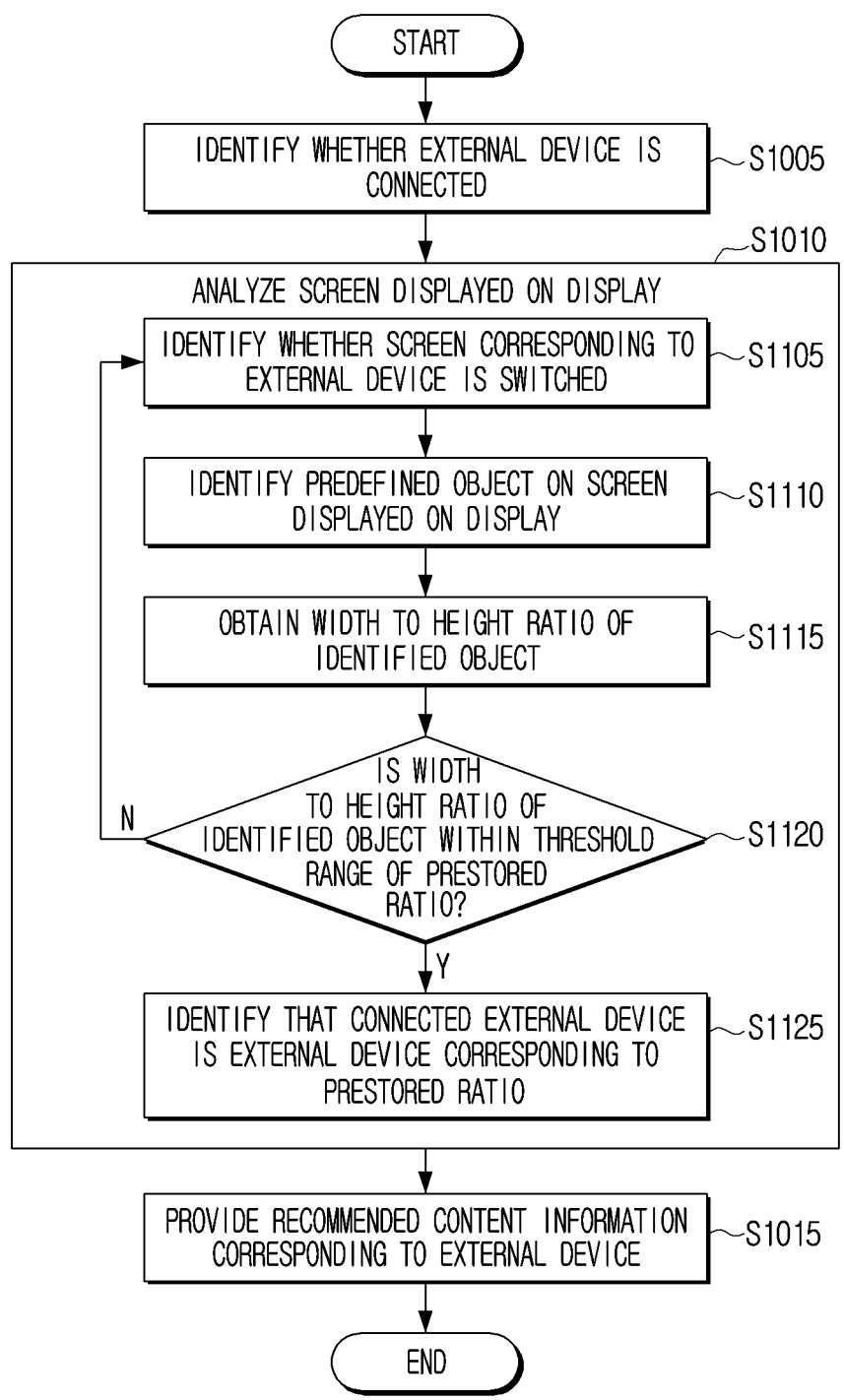
FIG. 11 is a flowchart specifically illustrating analysis of a screen displayed on a display among the operations of FIG. 10 according to an embodiment of the disclosure.

FIG. 11 is a flowchart specifically illustrating analysis of a screen displayed on a display among the operations of FIG. 10.

Referring to FIG. 11, in analyzing a screen displayed on a display, the electronic device 100 may identify whether a screen corresponding to an external device is switched in operation S1105. The electronic device 100 may display various screens on the display 130 on the basis of screen information received from an external device. For example, the electronic device 100 may display various screens according to a situation, such as a screen including a content provider list (e.g., 810 of FIG. 8) or a screen including a content list (e.g., 910 of FIG. 9). The electronic device 100 may identify whether a currently displayed screen is changed to another screen.

The electronic device 100 may identify a predefined object on a screen displayed on the display in operation S1110. The electronic device 100 may identify whether a predefined object is included in various screens displayed on the display 130. An edge detector module may be used to identify a predefined object. The edge detector module may be a technology for identifying an object based on the shape of the outline. The predefined object may refer to a part of a UI format configured to display a content providers list or a content list. For example, the predefined object may be rectangular or rounded rectangle. However, this is merely an illustration for an example, and a predefined object may be in various forms.

The electronic device 100 may obtain information on the horizontal and vertical ratio of the identified object in operation S1115. The electronic device 100 may obtain horizontal length information and vertical length information of the identified object. The electronic device 100 may obtain ratio information of a horizontal length and a vertical length.

The electronic device 100 may determine whether the information on the horizontal and vertical ratio of the identified object is within a threshold range of a pre-stored ratio in operation S1120. Since there may be some errors in obtaining horizontal length information and vertical length information, it is possible to perform an S1120 operation in consideration of a threshold range of a pre-stored ratio.

If the information on the width and length ratio of the identified object is within a threshold range of a pre-stored ratio, the electronic device 100 may identify that the connected external device is an external device corresponding to a pre-stored ratio in operation S1125. However, if the information on the horizontal and vertical ratio of the identified object is not within the threshold range of the pre-stored ratio, the electronic device 100 may check whether a screen corresponding to the external device is switched in operation S1105.

The electronic device 100 may provide a user with the recommended content information corresponding to the external device in operation S1015.

For example, it is assumed that the horizontal and vertical ratio information is 0.99 and the threshold range is 10%. It is assumed that the horizontal and vertical ratio information of a specific object (for example, a rectangular object displaying content) in a UI format provided by the C company is 1. Since the threshold range is 10%, the electronic device 100 may determine that the identified object matches the UI format information of the C company if the horizontal and vertical ratio information is between 0.9 and 1.1. The electronic device 100 may provide recommended content information corresponding to the C company to the user.

Referring to FIG. 11, the object is one, but in implementation, the electronic device 100 may determine all the plurality of objects. The electronic device 100 may determine the number of objects having the same width to length ratio information.

Figure 12:
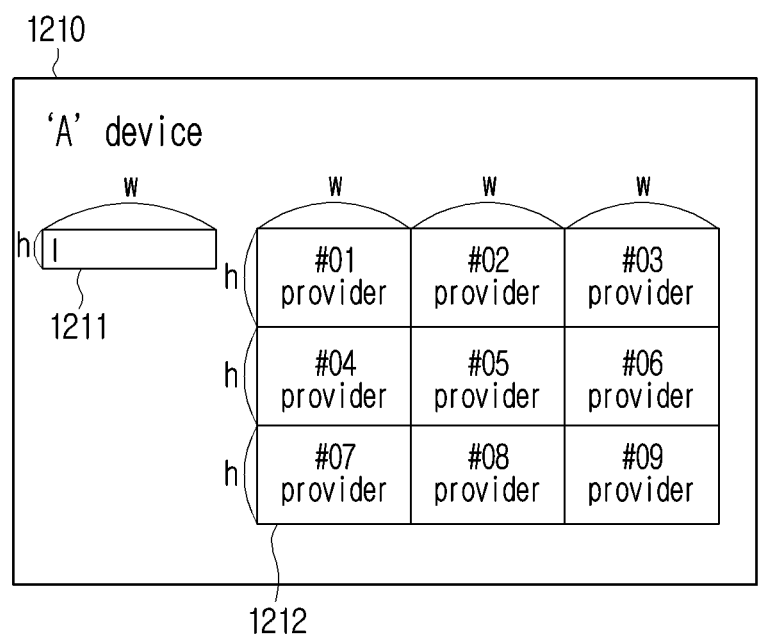
FIG. 12 is a diagram illustrating an operation of obtaining information related to an object on a screen provided by an external device according to an embodiment of the disclosure.

FIG. 12 is a diagram illustrating an operation of obtaining information related to an object on a screen provided by an external device.

Referring to FIG. 12, the objects of various sizes may be displayed on the screen displayed on the display 130.

A search window object 1211 and a content providers list object 1212 may be displayed on a screen 1210. A horizontal length and a vertical length of the search window object 1211 and the content providers list object 1212 may be different from each other. Accordingly, the electronic device 100 may obtain both horizontal and vertical ratio information of various objects displayed on the screen 1210, and may obtain information on the number of objects having the same ratio information. For example, the electronic device 100 may obtain information that an object having 0.75 ratio information is one and objects having 1 ratio information are nine.

The electronic device 100 may obtain identification information of the external device on the basis of the information on the horizontal and vertical ratio and the number of objects. The electronic device 100 may determine the number of objects on the basis of the horizontal and vertical ratio information of the object in the UI format information.

According to an embodiment, the electronic device 100 may obtain ratio information corresponding to the largest number of objects based on the information on the number of objects having the same ratio information. For example, an object having 0.75 ratio information may be 1, an object having ratio information of 1 may be 9, and a ratio information corresponding to the largest number of objects may be 1. The electronic device 100 may compare UI format information corresponding to each of the plurality of external device identification information stored in the memory 110 based on the ratio information corresponding to the largest number of objects. The electronic device 100 may obtain external device identification information on the basis of the ratio information corresponding to the largest number of objects among the UI format information.

According to an embodiment, the electronic device 100 may obtain identification information of the external device according to the equation (1215). The electronic device 100 may obtain a horizontal length (w) and a vertical length (h) of an object. The electronic device 100 may obtain horizontal and vertical ratio information (h/w). The electronic device 100 may obtain a first result value by multiplying the horizontal and vertical ratio information h/w and the number of objects n corresponding to the horizontal and vertical ratio information h/w. Since the first result value is a value in which the ratio information and the number information are reflected, the first result value may be used to identify the UI format. The electronic device 100 may check whether the first result value matches a predetermined value. When the first result value matches a predetermined value, the electronic device 100 may obtain identification information of the external device corresponding to the predetermined value. When determining whether the electronic device 100 matches a predetermined value, the electronic device 100 may check whether the value is within a threshold range of a predetermined value. For example, if the threshold range is 10%, it may be determined whether the first result value is between 90% value (p1) and 110% (p2) value of the predetermined value. If the obtained first result value is within a threshold range of a predetermined value, the electronic device 100 may determine that a screen displayed on the display 130 is an external device corresponding to a predetermined value.

According to another embodiment, the electronic device 100 may obtain information for each external device according to equation (1220). The electronic device 100 may obtain a second result value by summing the horizontal and vertical ratios of all objects without separately storing information on the number of objects corresponding to the ratio information. Since the second result value also includes UI format information included in the screen, the electronic device 100 may specify the external device based on the second result value. Since the description is the same as the above-described equation (1215), a redundant description is omitted.

In the above description, width to height ratio information is h/w, but in another example, the width to height ratio may be w/h.

FIG. 13 is a diagram illustrating an operation of displaying a screen provided by an external device and a screen provided by an electronic device simultaneously.

Referring to FIG. 13, a screen 1310 may display screen information 1320 provided by an external device and screen information 1330 provided by the electronic device 100 together on the display 130. The screen 1320 may be screen information including a search window and a content providers list in an external device. The screen 1330 may include a UI 1331 for displaying a plurality of external devices. The UI 1331 may include a focus area 1332 for focusing an external device of one of the plurality of external devices. In addition, according to an embodiment, a cursor 1333 for moving the focus area may be included. The screen (1330) may include a UI 1334 for providing recommended content information. The electronic device 100 may display recommended content information corresponding to a specific external device (Ain FIG. 13) on the UI 1334.

Figure 14:
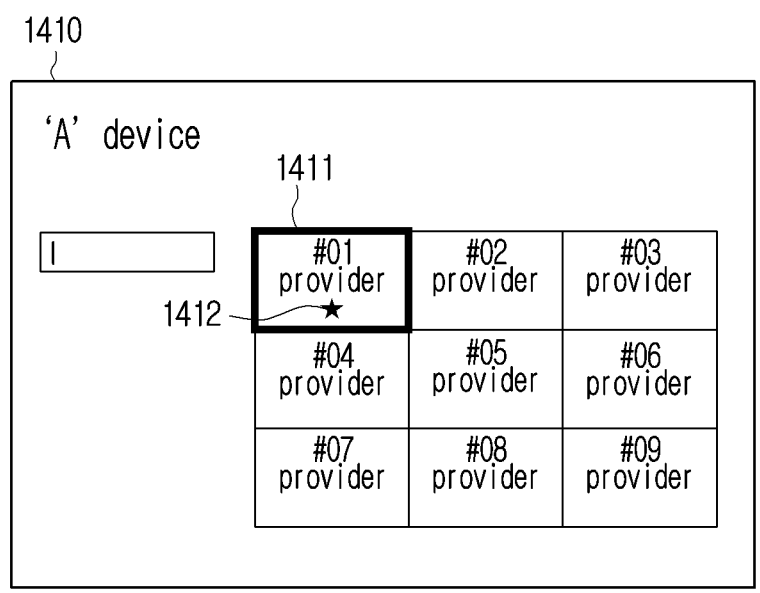
FIG. 14 is a diagram illustrating a guide UI for recommendation according to an embodiment of the disclosure.

FIG. 14 is a diagram illustrating a guide UI for recommendation according to an embodiment of the disclosure.

Referring to FIG. 14, a screen 1410 may include a search window and a content providers list. The screen 1410 may be a screen provided by a specific external device, and it is assumed that viewing history information for a specific external device is stored in the memory 110.

The electronic device 100 may obtain UI format information based on a screen 1410, and obtain identification information of an external device corresponding to a screen 1410 by comparing UI format information stored in the memory 110. The electronic device 100 may obtain recommended content information corresponding to the external device based on the obtained identification information of the external device. The recommended content information may include recommended content and content providers that provide recommended content.

The electronic device 100 may analyze all objects in a screen 1410 provided by an external device. For example, the electronic device 100 may analyze a text and an image included in a screen 1410 in units of content. The electronic device 100 may determine whether the text or image of all objects displayed on the screen 1410 matches recommended content information. If it is determined that an object matching recommended content information exists on the screen 1410, the electronic device 100 may generate at least one of a UI 1411 for guiding a focus area and a UI 1412 for guiding the degree of recommendation, and may display the generated UI in an area corresponding to the corresponding object.

As the electronic device 100 displays guide UIs 1411, 1412 and a user may easily grasp the position of the recommend content.

It has been described that the electronic device 100 generates a guide UI, but according to an embodiment, the guide UI may be generated in an external device or in an external server.

According to another embodiment, a guide UI for recommending specific content providers among a plurality of content providers may be displayed on the display 130 regardless of recommended content information. The specific content providers may be determined on the basis of user's viewing history information, a user's setting, a setting command received from an external server, and the like.

Figure 15:
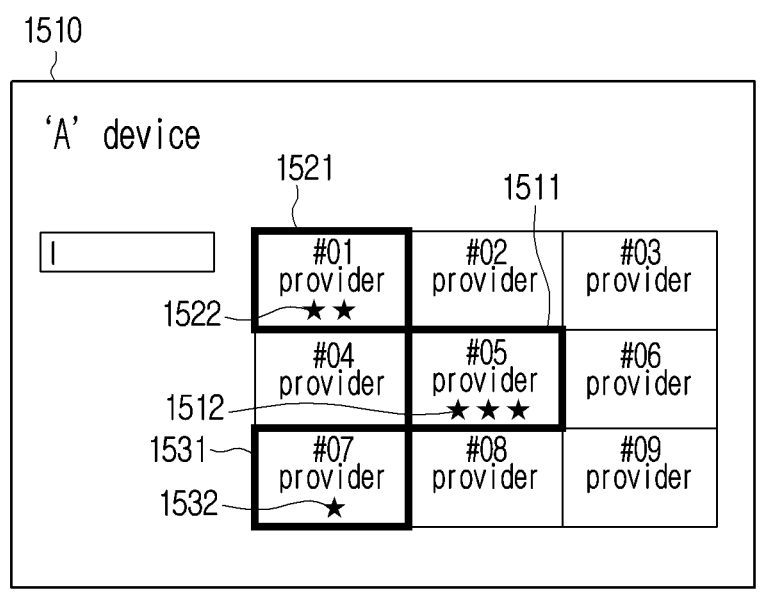
FIG. 15 is a diagram illustrating a guide UI for recommendation according to another embodiment of the disclosure.

FIG. 15 is a diagram illustrating a guide UI for recommendation according to another embodiment of the disclosure.

Referring to FIG. 15, the electronic device 100 may display a plurality of guide UIs on a screen 1510. It is assumed that there are a plurality of content providers providing recommended content. The electronic device 100 may display a guide UI on all areas corresponding to a plurality of content providers providing the recommended content. Accordingly, a user may easily identify content providers providing recommended content from among a plurality of content providers.

The electronic device 100 may generate at least one of UI 1511,1521,1531 for guiding a focus area to a corresponding object and UI 1512,1522,1532 for guiding the degree of recommendation in order to simultaneously display a guide UI for a plurality of content providers. In addition, UIs 1512, 1522, 1532 for guiding the degree of recommendation may be different UI images according to the degree of recommendation. For example, the higher the degree of recommendation may display an image including more UIs. For example, the electronic device 100 may display a UI 1512 having three stars in an area corresponding to content providers having the highest degree of recommendation, display a UI 1522 having two stars in an area corresponding to the content providers having an intermediate recommendation degree, and display a UI 1532 having one star in an area corresponding to the content providers the lowest recommendation degree.

Figure 16:
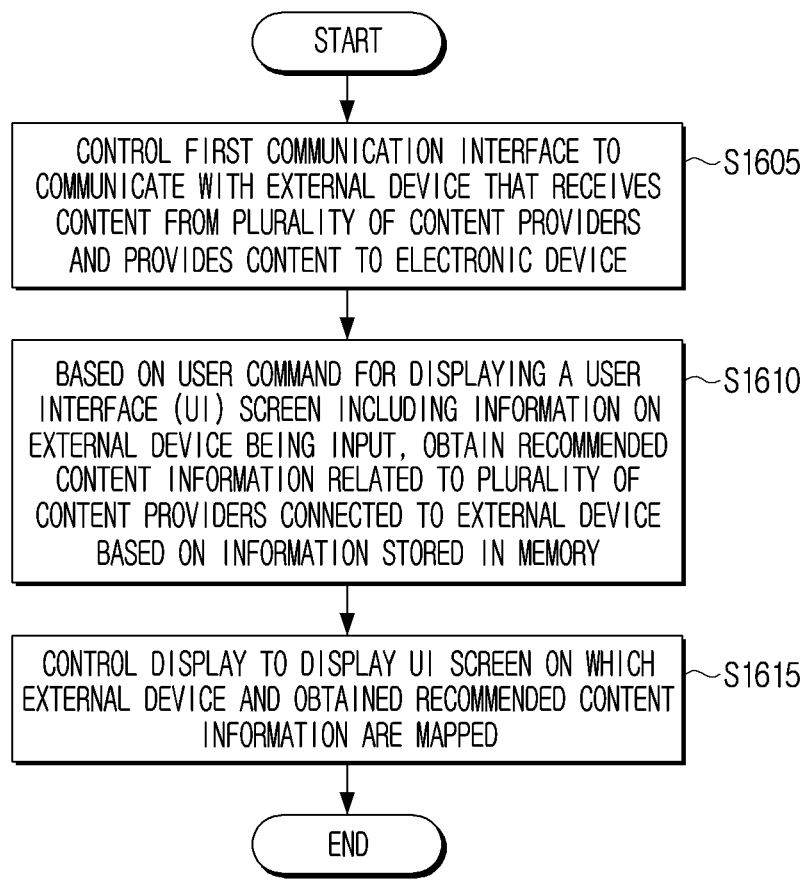
FIG. 16 is a flowchart illustrating a control method of an electronic device according to an embodiment of the disclosure.

FIG. 16 is a flowchart illustrating a control method of an electronic device according to an embodiment of the disclosure.

Referring to FIG. 16, a control method of an electronic device that stores recommended content information for each external device may include controlling a first communication interface to communicate with an external device that receives content from a plurality of content providers and provides the content to the electronic device in operation S1605.

The method may include, based on a user command for displaying a user interface (UI) screen including information on the external device being input, obtaining recommended content information related to the plurality of content providers connected to the external device based on the stored information in operation S1610.

The method may include displaying a UI screen on which the external device and the obtained recommended content information are mapped, and the stored information may be obtained based on viewing history information corresponding to the external device in operation S1615.

The method may further include, based on a menu corresponding to the external device included in the UI screen being selected, displaying an image received from the external device, obtaining identification information corresponding to the external device based on UI format information included in the displayed image; based on viewing history information related to the external device being obtained, mapping the obtained viewing history information with the identification information and storing the mapped information in a memory; and controlling the second communication interface to transmit the information stored in the memory to an external server.

The obtaining identification information corresponding to the external device may include storing device information comprising identification information for each external device and UI format information received from the external device through the second communication interface in the memory, and obtaining identification information corresponding to the external device based on the device information stored in the memory and the UI format information included in the displayed image.

The UI format information stored in the memory may include information of a size of an object mapped to identification information of each external device, the obtaining identification information corresponding to the external device may include identifying size information of the object included in the displayed image, and obtaining identification information corresponding to the external device by comparing the identified size information of the object and the size information of the object stored in the memory.

The UI format information stored in the memory may include horizontal and vertical length ratios of the object mapped to the identification information of each external device and configuration information related to a number of the object, and the obtaining identification information corresponding to an external device may include identifying size information and number information of an object included in the displayed image, and obtaining the identification information corresponding to the external device by comparing the identified size and number information of the object and the configuration information stored in the memory.

The UI screen may include information about a first external device and a second external device, the information about the first external device and the second external device may include menu information and recommended content information corresponding to each of the first external device and the second external device, the recommended content information related to the first external device may be information obtained based on viewing history information corresponding to the first external device, and the recommended content information related to the second external device may be information received from an external server.

The method may further include, based on a menu corresponding to the external device included in the UI screen being selected, displaying an image received from the external device and the UI screen together.

The method may further include obtaining recommended content information related to the external device based on an image received from the external device, and displaying the UI screen comprising the recommended content information.

The method may further include, based on a menu corresponding to the external device included in the UI screen being selected, displaying the image received from the external device, identifying an object corresponding to a focused area corresponding to a user command among a plurality of objects included in the displayed image, obtaining at least one of the content providers information or content information corresponding to the identified object, mapping at least one of the obtained content providers information or content information to the external device and storing the information in the memory, and controlling the second communication interface to transmit the information stored in the memory to an external server.

The method for controlling the electronic apparatus shown in FIG. 16 may, for example, and without limitation, be performed on an electronic device having the configuration of FIG. 1 or FIG. 2, and may be executed on an electronic device having other configurations.

Meanwhile, the methods according to various embodiments of the disclosure described above may be implemented in an application form that may be installed in an existing electronic apparatus.

The methods according to the various embodiments as described above may be implemented as software upgrade or hardware upgrade for a related-art electronic apparatus.

The various embodiments described above may be performed through an embedded server provided in an electronic apparatus or an external server of at least one electronic apparatus and a display device.

According to an embodiment, the various embodiments described above may be implemented as software including instructions stored in a machine-readable storage media which is readable by a machine (e.g., a computer). The device may include the electronic apparatus according to the disclosed embodiments, as a device which calls the stored instructions from the storage media and which is operable according to the called instructions. When the instructions are executed by a processor, the processor may perform functions corresponding to the instructions using other components or the functions may be performed under a control of the processor. The instructions may include code generated by a compiler or a code executed by an interpreter. The machine-readable storage media may be provided in a form of a non-transitory storage media. The 'non-transitory' storage media may not include a signal and is tangible, but does not distinguish whether data is stored semi-permanently or temporarily in the storage media.

According to an embodiment, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

Further, each of the components (e.g., modules or programs) according to the various embodiments described above may be include a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

While the disclosure has been illustrated and described with reference to various example embodiments, it will be understood that the various example embodiments are intended to be illustrative, not limiting. In other words, the disclosure is not limited to the specific embodiments described above. It will be further understood by those skilled in the art that various changes in form and detail may be made without departing from the true spirit and full scope of the disclosure, including the appended claims and their equivalents.

What is claimed is:

1. An electronic device comprising:
   a display;
   a communication interface;
   a memory to store recommended content information to be provided to a plurality of external devices; and
   a processor configured to:
   control the communication interface to communicate with an external device, among the plurality of external devices, that provides content received from a plurality of content providers to the electronic device,
   control the display to display an image received from the external device,
   obtain identification information identifying the external device based on a user interface (UI) format associated with an attribute according to which the image received from the external device is to be displayed in a user interface (UI) screen,
   obtain recommended content information, among stored recommended content information, which is stored in the memory based on mapping for display through different external devices, based on the identification information obtained according to the image received from the external device, and
   control the display to display the UI screen including the obtained recommended content information.

2. The electronic device of claim 1, wherein the processor is further configured to obtain the identification information corresponding to the external device based on the UI format included in the image received from the external device.

3. The electronic device of claim 2, wherein the communication interface is a first communication interface and the electronic device further comprises:
   a second communication interface,
   wherein the processor is further configured to:
   receive device information comprising identification information for each of the plurality of external devices and the UI format received from an external server through the second communication interface,
   store the received device information comprising the identification information for each of the plurality of external devices and the UI format received from the external server through the second communication interface in the memory, and
   obtain the identification information corresponding to the external device by comparing the UI format included in the image received from the external device and the UI format stored in the memory.

4. The electronic device of claim 3, wherein the UI format stored in the memory comprises information of a size of an object corresponding to each of the plurality of external devices,
   wherein the processor is further configured to:
   identify size information of an object included in the image received from the external device, and
   obtain the identification information corresponding to the external device by comparing the identified size information of the object and the size information of the object corresponding to the plurality of external devices stored in the memory.

5. The electronic device of claim 3, where in the UI format stored in the memory comprises horizontal and vertical length ratios of an object corresponding to each of the plurality of external devices and configuration information related to a number of the object,
   wherein the processor is further configured to:
   identify configuration information related to size information and number information of an object included in the image received from the external device, and
   obtain the identification information corresponding to the external device by comparing the identified configuration information and the configuration information stored in the memory.

6. The electronic device of claim 1, wherein the UI screen comprises a menu to allow a selection between a first external device and a second external device.

7. The electronic device of claim 1, wherein the processor is further configured to, based on the one external device being selected through a menu, control the display to display the image received from the external device together with the UI screen comprising recommended content information corresponding to the external device together.

8. The electronic device of claim 7, wherein the processor is further configured to obtain the identification information corresponding to the external device based on the image received from the external device upon the external device being selected through the menu, and
obtain the recommended content information corresponding to the external device based on the obtained identification information.

9. The electronic device of claim 7, wherein the processor is further configured to identify at least one object among a plurality of objects included in the image received from the external device by analyzing the image received from the external device, and
control the display to display a guide UI for recommending the identified at least one object.

10. The electronic device of claim 1, wherein the processor is further configured to, based on a menu corresponding to the external device included in the UI screen being selected, control the display to display the image received from the external device,
identify at least one object among a plurality of objects included in the received image by analyzing the received image, and
control the display to display a guide UI to recommend the identified at least one object.

11. The electronic device of claim 1, wherein the communication interface is a first communication interface and the electronic device further comprises:
a second communication interface, and
wherein the processor is further configured to:
identify an object corresponding to a focused area according to a user command among a plurality of objects included in the image received from the external device,
obtain at least one of content provider information and content information corresponding to the identified object,
map at least one of the obtained content provider information and content information to the external device and store the mapped information in the memory as viewing history information, and
control the second communication interface to transfer the viewing history information stored in the memory to an external server.

12. A control method of an electronic device storing recommended content information of a plurality of external devices, the method comprising:
receiving content from a plurality of content providers and communicating with an external device, among the plurality of external devices, providing the received content to the electronic device;
displaying an image received from the external device;
obtaining identification information identifying the external device based on a user interface (UI) format associated with an attribute according to which the image received from the external device is to be displayed in a user interface (UI) screen;
obtaining recommended content information, among stored recommended content information based on mapping for display through different external devices, corresponding to the external device that is identified based on the identification information obtained according to the image received from the external device; and
displaying the UI screen including the obtained recommended content information.

13. The control method of claim 12, wherein the identification information corresponding to the external device is obtained based on UI format included in the image received from the external device.

14. The control method of claim 13, further comprising:
receiving device information comprising identification information for each of the plurality of external devices and UI format received from an external server; and
storing the received device information comprising the identification information for each of the plurality of external devices and the UI format received from the external server, and
wherein the identification information corresponding to the external device is obtained by comparing the UI format included in the image received from the external device and the stored UI format.

15. The control method of claim 14, wherein the stored UI format comprises information of a size of an object corresponding to each of the plurality of external devices,
wherein the obtaining the identification information comprises:
identifying size information of the object included in the image received from the external device, and
obtaining identification information corresponding to the external device by comparing the identified size information of the object and the stored size information of the object.

16. The electronic device of claim 1, wherein the UI format includes information indicating at least one of location, size, number or shape of at least one object included in the UI screen.

17. The electronic device of claim 1, wherein the UI format includes at least one of a manufacturer name of the external device, a search box or a list of the plurality of content providers.

18. The electronic device of claim 12, wherein the UI format includes information indicating at least one of location, size, number or shape of at least one object included in the UI screen.

19. The electronic device of claim 12, wherein the UI format includes at least one of a manufacturer name of the external device, a search box or a list of the plurality of content providers.

* * * * *